(12) United States Patent
Readshaw

(10) Patent No.: US 8,365,246 B2
(45) Date of Patent: Jan. 29, 2013

(54) PROTECTING CONFIDENTIAL INFORMATION ON NETWORK SITES BASED ON SECURITY AWARENESS

(75) Inventor: Neil Readshaw, Parkwood (AU)

(73) Assignee: International Business Machines Corporation, Armonk, NY (US)

( * ) Notice: Subject to any disclaimer, the term of this patent is extended or adjusted under 35 U.S.C. 154(b) by 1126 days.

(21) Appl. No.: 12/050,489

(22) Filed: Mar. 18, 2008

(65) Prior Publication Data

US 2009/0241168 A1   Sep. 24, 2009

(51) Int. Cl.
*H04L 29/06* (2006.01)
(52) U.S. Cl. .............................. 726/2; 726/25
(58) Field of Classification Search .............. 380/22, 380/27, 28; 726/1, 2, 22–25; 713/188
See application file for complete search history.

(56) References Cited

U.S. PATENT DOCUMENTS

| | | | |
|---|---|---|---|
| 7,535,861 B2 * | 5/2009 | Buchholz et al. | 370/310 |
| 7,540,013 B2 * | 5/2009 | Freund | 726/1 |
| 7,877,786 B2 * | 1/2011 | van Bemmel | 726/4 |
| 2004/0250107 A1 | 12/2004 | Guo | |
| 2006/0179060 A1 | 8/2006 | Shilo et al. | |
| 2008/0271124 A1 * | 10/2008 | Nisbet et al. | 726/4 |

* cited by examiner

*Primary Examiner* — Ali Abyaneh
(74) *Attorney, Agent, or Firm* — Yee & Associates, P.C.; Jeffrey S. LaBaw

(57) ABSTRACT

A system for protecting confidential information based upon user security awareness is provided. The system includes a network interface for connecting the system to a plurality of remotely-located network sites. The system also includes one or more processors on which at one or more data processing feature execute in response to a request received from a user of one of the remotely-located network sites. The system further includes a security-awareness module configured to execute in conjunction with the one or more processors for determining a measure of security awareness of the user, and for granting or denying the user access to the at least one data processing feature based upon the measure of security awareness.

17 Claims, 3 Drawing Sheets

| User₁ | Awareness Level 1 |
|---|---|
| User₂ | Awareness Level 1 |
| ⋮ | ⋮ |
| User_{n-1} | Awareness Level 10 |
| User_n | Awareness Level 10 |

FIG. 3

PROTECTING CONFIDENTIAL INFORMATION ON NETWORK SITES BASED ON SECURITY AWARENESS

FIELD OF THE INVENTION

The present invention is related to the field of data communications, and more particularly, to techniques for fostering the protection of information pertaining to users engaged in the exchange of data over data communications networks.

BACKGROUND OF THE INVENTION

As utilization of the Internet increases and the number of Web sites grows, the level of sophistication of various Internet users can be expected to become more varied. Already, many different types of Internet Web sites have large, diverse user bases. The wide array of Web sites currently accessed by this diverse set of users ranges from social networking sites, to on-line sites for facilitating financial and other transactions, to e-commerce sites for advertising and selling products and services to on-line customers.

Unsurprisingly, given the amount of information exchanged through such sites, computer hackers intent on perpetrating identity theft or obtaining confidential user information often target popular Web sites and their users. Although certain users have at least some awareness of the risks associated with such sites and at least some ability to protect themselves, other users with less innate skill or accumulated experience are more vulnerable.

A prevalent technique for illicitly obtaining confidential information, for example, is phishing. Phishing is an attempt to criminally and fraudulently acquire sensitive information, such as a username, password, or credit card information, by posing as a trustworthy entity. Phishing is typically carried out by email or instant messaging, and often directs a user to enter confidential information at a Web site.

Current approaches that attempt to protect Web sites and their users include providing users with enhanced technology, such as stronger authentication mechanisms. While solutions such as two-factor authentication devices can reduce phishing attacks, the solutions do not necessarily eliminate them. Strong authentication technology and solutions, moreover, typically add to the cost of operating a site, cost that is ultimately borne by consumers who use the site. Such approaches also can increase the complexity confronting users.

Another approach is to restrict access to advanced functions on a Web site to those users who have formed a stronger relationship with the sponsor of the site. For example, before a user can use a particular site, the user might be required to register certain verifiable financial information at the site. A drawback of this solution is that providing such information does not guarantee that the user is any more aware of the need for security, let alone how to achieve it, but rather only that the user has certain financial resources and is willing to share information pertaining to those resources. While such an approach can offer the Web site sponsor greater protection from fraud, it does little or nothing to enhance security for users of the site.

SUMMARY OF THE INVENTION

The present invention is directed to systems and methods for preventing the disclosure of personal or other confidential information on data communication network sites, such as Internet Web sites. The invention introduces a unique paradigm of network security. This paradigm eschews an exclusively technology-focused solution and recognizes that effective and scalable network protection can be achieved based upon an individual user's security awareness. The invention measures a user's network security awareness and utilizes this measure to control the user's access to the various functions and capabilities of a network site.

One embodiment is a system for protecting confidential information based upon different users' security awareness. The system can include a network interface for connecting the system to a plurality of remotely-located network sites. The system also can include one or more processors communicatively linked to the network interface. The one or more processors can execute one or more data processing features in response to a request received from a user of one of the remotely-located network sites. The system can further include a security-awareness module configured to execute in cooperation with at least one processor for determining a measure of security awareness of the user, and for granting or denying the user access to the data processing feature or features based upon the determined measure of security awareness.

Another embodiment is a computer-implemented method for protecting confidential information based upon different users' security awareness. The method can include determining a measure of security awareness of a user in response to the user accessing a network-connected site. The method further can include granting or denying the user access to at least one feature of the site based upon the measure of security awareness.

Still another embodiment is a computer-readable storage medium, such as an optical disk, in which is embedded computer-readable code. The computer-readable code can be configured such that, when loaded onto a computer, the code causes the computer to perform the following steps: determining a measure of security awareness of a user in response to the user accessing a network-connected site; and granting or denying the user access to at least one feature of the site based upon the measure of security awareness.

BRIEF DESCRIPTION OF THE DRAWINGS

There are shown in the drawings, embodiments which are presently preferred. It is expressly noted, however, that the invention is not limited to the precise arrangements and instrumentalities shown.

FIG. 3 is an exemplary table of electronically stored information pertaining to a plurality of network users and their corresponding levels of security awareness, according to one embodiment of the invention.

DETAILED DESCRIPTION

The invention is directed to systems and methods for preventing the disclosure of personal or other confidential information on data communication network sites, such as Internet Web sites. The invention is based on a novel paradigm of network security that avoids an exclusively technology-based approach, and instead, recognizes that effective and scalable network security is achieved by empowering users with knowledge and awareness. The invention fosters protection of information exchanged over data communications networks based upon individual users' security awareness. More particularly, the invention measures a user's network security awareness and uses this metric to control the user's access to different functions and/or capabilities of a network site.

One advantage of this approach is that it is based upon the intrinsic knowledge that a user of a network site possesses about relevant aspects of network security. Another advantage is that the approach is independent of the user's financial status. Still another advantage is that the approach is independent of security technologies used by a particular site at any given point in time. A network site that utilizes the invention can reduce fraud and security breaches pertaining to personal and confidential user information, thereby generating user goodwill and enhancing the site sponsor's reputation. Moreover, by promoting greater user security awareness, the invention can generate spillover benefits with respect to even those sites that do not utilize the invention.

Figure 1:
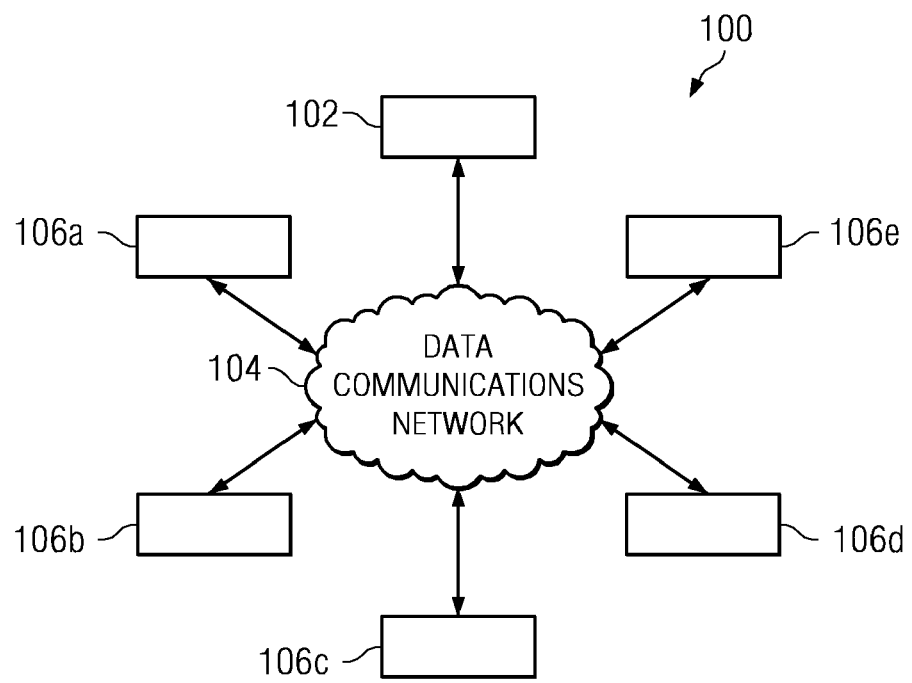
FIG. 1 is a schematic view of an exemplary environment in which a system for protecting confidential information based upon a user's security awareness is utilized, according to one embodiment of the invention.

FIG. 1 is a schematic view of an exemplary environment 100 in which a system 102 for protecting confidential information based upon a user's security awareness is utilized, according to one embodiment of the invention. Illustratively, the exemplary environment 100 comprises a data communications network 104, such as the Internet, which includes a plurality of network-connected sites 106a-e that are communicatively linked to the system 102 through the network. While the exemplary environment 100 illustratively comprises five network-connected sites 106a-e communicatively linked to the system 102, it will be readily apparent to one of ordinary skill that the environment alternatively can comprise a data communications network having any number of network-connected sites.

Figure 2:
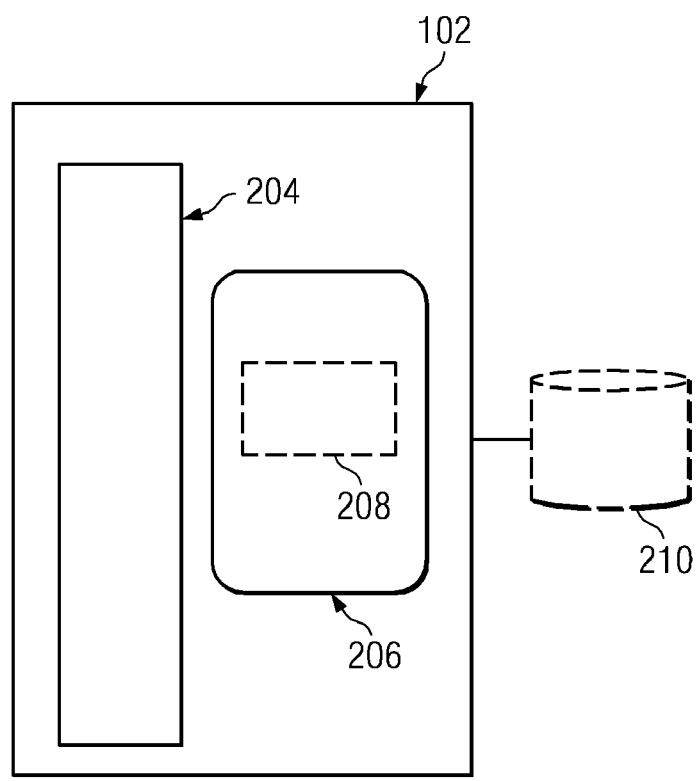
FIG. 2 is a schematic view of a system for protecting confidential information based upon a user's security awareness, according one embodiment of the invention.

Referring additionally to FIG. 2, a more detailed view of the system 102 is schematically shown. The system 102 illustratively includes a network interface 204. The system 102 also illustratively includes one or more processors 206 communicatively linked to the network interface 204. Additionally, the system 102 illustratively includes a security-awareness module 208 that executes in cooperation with the one or more processors 206 for effecting the functions and procedures described herein. Optionally, the system 102 can include non-volatile memory 210 for electronically storing processor-executable code and/or electronic data, as will be readily understood by one of ordinary skill in the art.

According to one embodiment, the security-awareness module 208 is implemented in processor-executable code configured to execute upon the one or more processors 206 for carrying out the described functions and procedures. Alternatively, however, the security-awareness module 208 can be implemented in dedicated hardwired circuitry configured to perform the same functions and procedures. In still another embodiment, the security-awareness module 208 can be implemented in a combination of executable code and dedicated circuitry.

The network interface 204 illustratively connects the system 102 to each of the remotely-located network sites 106a-e through the data communications network 104. The one or more processors 206 can execute code for performing various data processing functions and procedures. The procedures and functions can implement a variety of different data processing features. In one embodiment, the different features comprise social networking features that allow users to exchange personal profiles, photos, music, videos and/or other data content. In an alternative embodiment, the data processing features provided by the one or more processors 206 can facilitate the interactive exchange of data for buying and selling products over the data communications network 104, for example.

According to still another embodiment, the data processing features provided by the one or more processors 206 can encompass the exchange of financial data, such as for performing on-line banking or other on-line financial transactions. Indeed, any of a wide variety of different data processing features can be performed depending on the particular code executing upon the one or more processors 206.

Operatively, the security-awareness module 208 is configured to execute in cooperation with the one or more processors 206 for determining a measure of security awareness of a user. Depending on the determined measure of security awareness, the security-awareness module 208 causes the user to be granted or denied access to one or more of the data processing features. As used herein, the term security awareness refers to any metric for ordering or ranking, on a predetermined scale, the user's knowledge about or familiarity with certain aspects pertaining to network security. Different levels of security awareness, for example, can be represented on a numerical sliding scale, such as one to ten or one to a hundred. Alternatively, different levels of security awareness can be represented by a non-numeric ordering, such as "A" through "E" or "Expert" through "Novice." Indeed, any ordering or ranking on a predetermined scale can be used provided that the ordering or ranking adequately distinguishes between different levels of security awareness.

The optionally-included database 112 can store a list of users of a network site utilizing the system 100. For each user, a corresponding profile can comprise that particular user's measured security awareness. FIG. 3 provides an exemplary table 300 that can be electronically stored in the database 112. As illustrated, for each user, one through n, a corresponding measure of security awareness (on a representative scale of one to ten) is stored along with a user identifier.

The particular operations, functions, transactions, and capabilities of any network site utilizing the system 100 can each be associated with a designated minimum security awareness level that a user must possess in order to access or use that portion of the site. For example, a request to accept unsolicited friend requests on a social networking site can have a higher required security awareness level than would, for example, searching and soliciting friends by e-mail address. Likewise, with respect to an on-line banking site, transferring money to external accounts can require the user have a greater security awareness than required for transferring funds between the user's own accounts at the same banking institution.

As already described, when a user attempts to access a particular part of a network site, such as an Internet Web site, the user's personal security awareness level is compared with that corresponding to the particular part of the site. If the user's level of security awareness matches or exceeds that required for the corresponding part of the site, then the user is granted access to that part or function of the site. Otherwise, the user is denied access. According to one embodiment, the the security-awareness module 208 can be configured to cause the one or more processors 206 to issue an access-denied message if the user's level of security awareness is less than that required for the corresponding part of the site. According to another embodiment, if the user's level of security awareness is less than that required for the corresponding part of the site, the security-awareness module 208 can be configured to cause the one or more processors 206 to direct the user to a page where the user can choose to invest the time and effort needed to enhance the user's security awareness.

Accordingly, in one embodiment, the security-awareness module 208 can be configured to measure the security awareness of the user based upon past user actions. The security-awareness module 208, additionally or alternatively, can be configured to revise the measure of security awareness in response to the user demonstrating a change in security awareness.

According to a particular embodiment, the security-awareness module 208 is configured to assign an initial minimum security awareness level to each newly-registered user. The level of security awareness is incremented if a particular user demonstrates increased security awareness. Alternatively, a newly-registered user can initially be assigned a maximum security awareness level by the security-awareness module 208. The level of security awareness for the user is subsequently decremented if the user exhibits behavior indicating less security awareness than that associated with the maximum.

For example, the security-awareness module 208 can be configured to present an on-line security awareness tutorial to the user and to revise the measure of security-awareness based on user responses to the on-line security-awareness tutorial (e.g., by interactively responding to questions presented during or after completion of the tutorial).

According to another embodiment, the security-awareness module 208 can be configured to simulate a security attack against the user. Depending on how the user responds to the simulated attack, the security awareness module can increment or decrement the measure of security awareness.

The impact that a particular event has on a user's security awareness level can depend on the nature of the event. This is an aspect that, according to one embodiment, can be configurable by a site administrator. For example, a bank might assign a larger negative impact or security awareness decrement to a user responding to a phishing e-mail than an e-commerce or auction site might assign. The particular approach to revising a user's security awareness measure can depend on the particular business model associated with a particular site. For example, an on-line banking site might utilize the approach wherein the user is initially assigned a minimum security awareness level, while an on-line e-commerce site might employ the alternative approach of initially assigning a user the maximum level of security awareness. With the latter, users can be fully productive sooner, and can alter their security awareness gradually over time.

Although the system 100 has been described in the context of a single site that utilizes the system, it will be readily apparent that in an alternative embodiment an external service provider can provide security awareness protection to multiple, different sites. The service provider can maintain and evaluate the security awareness of different users who access the different sites served by the service provider.

Figure 4:
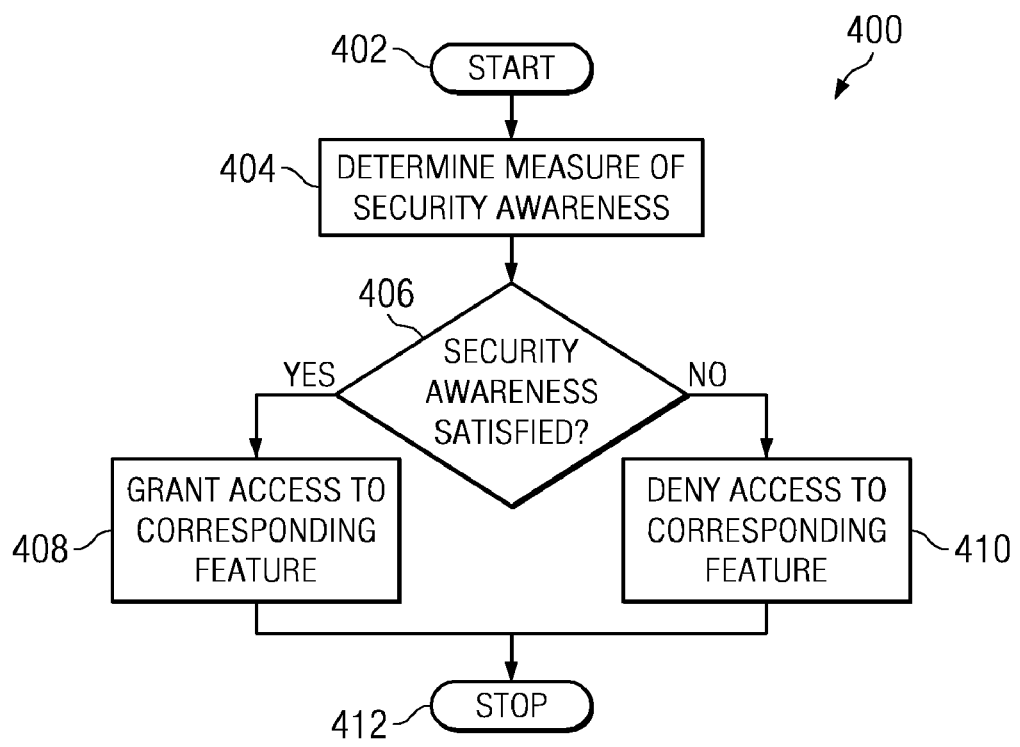
FIG. 4 is a flowchart of exemplary steps in a method for protecting confidential information based upon a user's security awareness, according to another embodiment of the invention.

FIG. 4 is a flowchart of exemplary steps in a method 400 for protecting confidential information based upon a user's security awareness, according to another embodiment of the invention. The method 400 includes, after the start at step 402, determining a measure of security awareness of a user at step 404. At step 406, a determination is made as to whether or not the user's measured security awareness is such that the user should be permitted access to a requested portion of the site (e.g., a particular process or function). If the user's level of security awareness matches or exceeds that required for the requested portion of the site, then at step 408 the user is granted access. Otherwise, the user is denied access at step 410. The method 400 illustratively concludes at step 412.

The method 400 also can include determining the measure of security awareness of the user based upon past user actions and revising the measure of security awareness in response to the user demonstrating increased security awareness. For example, the user can demonstrate increased security awareness by responding to an on-line security-awareness tutorial. The method 400, additionally or alternatively, can include revising the measure of security awareness in response to the user demonstrating a reduced security awareness. For example, the user can demonstrate a reduced security awareness by responding adversely to a simulated security attack.

According to one embodiment, wherein the network-connected site comprises a plurality of user-accessible features, the method 400 further includes associating each of the user-accessible features with a corresponding level of security awareness. Accordingly, the method 400 can comprise granting or denying the user access to a particular one of the plurality of user-accessible features based upon a comparison of the determined measure of security awareness with the level of security awareness corresponding to the particular user-accessible feature.

The invention, as already noted, can be realized in hardware, software, or a combination of hardware and software. The invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention, as also already noted, can be embedded in a computer program product, such as an optical disk or magnetic tape, and in which is embedded computer-readable code defining a computer program that when loaded on a computer enables the computer to implement the methods described herein. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing description of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

I claim:

1. A computer-implemented method for protecting confidential information based upon user security awareness, the method comprising:
   in response to a user accessing a network-connected site, determining, by a microprocessor, a measure of security awareness of the user, wherein the security awareness comprises the user's knowledge about aspects pertaining to network security; and
   granting or denying the user access to at least one feature of the site based upon the measure of security awareness, wherein the user demonstrates a reduced security awareness by responding adversely to a simulated security attack.

2. The method of claim 1, further comprising determining the measure of security awareness of the user based upon past user actions.

3. The method of claim 1, further comprising revising the measure of security awareness in response to the user demonstrating increased security awareness.

4. The method of claim 3, wherein the user demonstrates increased security awareness by responding to an on-line security-awareness tutorial.

5. The method of claim 1, further comprising revising the measure of security awareness in response to the user demonstrating a reduced security awareness.

6. The method of claim 1, wherein the network-connected site comprises a plurality of user-accessible features, and further comprising associating each of the user-accessible features with a corresponding level of security awareness.

7. The method of claim 6, wherein the user is granted or denied access to a particular one of the plurality of user-accessible features based upon a comparison of the determined measure of security awareness with the level of security awareness corresponding to the particular user-accessible feature.

8. A system for protecting confidential information based upon user security awareness, the system comprising:
   a network interface for connecting the system to a plurality of remotely-located network sites;
   at least one microprocessor communicatively linked to the network interface, the at least one microprocessor executing at least one data processing feature in response to a request received from a user of one of the remotely-located network sites; and
   a security-awareness module comprising microprocessor executable code configured to execute in cooperation with the at least one microprocessor:
   to determine a measure of security awareness of the user, wherein the security awareness comprises the user's knowledge about aspects pertaining to network security,
   to grant or deny the user access to the at least one data processing feature based upon the measure of security awareness, and
   to simulate a security attack against the user and to revise the measure of security awareness based upon a user response to the simulated security attack.

9. The system of claim 8, wherein the security-awareness module is configured to measure the security awareness of the user based upon past user actions.

10. The system of claim 8, wherein the security-awareness module is configured to revise the measure of security awareness in response to the user demonstrating a change in security awareness.

11. The system of claim 10, wherein the security-awareness module is configured to present an on-line security awareness tutorial to the user and to revise the measure of security awareness based on user responses to the on-line security awareness tutorial.

12. The system of claim 8, wherein the security-awareness module is configured to grant or deny access to a particular one of a plurality of user-accessible features based upon a comparison of the determined measure of security awareness with a level of security awareness corresponding to the particular user-accessible feature.

13. A computer program product comprising:
   a non-transitory computer-readable storage medium comprising embedded computer-readable code, which when loaded onto a computer causes the computer to:
   determine a measure of security awareness of a user in response to the user accessing a network-connected site, wherein the security awareness comprises the user's knowledge about aspects pertaining to network security;
   grant or deny the user access to at least one feature of the site based upon the measure of security awareness; and
   simulate a security attack against the user and to revise the measure of security awareness based upon a user response to the simulated security attack.

14. The computer program product of claim 13, further comprising computer-readable code for causing the computer to measure the security awareness of the user based upon past user actions.

15. The computer program product of claim 13, further comprising computer-readable code for causing the computer to revise the measure of security awareness in response to the user demonstrating a change in security awareness.

16. The computer program product of claim 13, further comprising computer-readable code for causing the computer to present an on-line security awareness tutorial to the user and to revise the measure of security awareness based on user responses to the on-line security awareness tutorial.

17. The computer program product of claim 13, wherein the network-connected site comprises a plurality of user-accessible features, and further comprising computer-readable code for causing the computer to grant or deny access to a particular one of the plurality of user-accessible features based upon a comparison of the determined measure of security awareness with the level of security awareness corresponding to the particular user-accessible feature.

* * * * *